United States Patent
Buckley et al.

(10) Patent No.: US 10,110,264 B2
(45) Date of Patent: *Oct. 23, 2018

(54) FULL DUPLEX RESOURCE REUSE ENABLEMENT

(71) Applicant: BlackBerry Limited, Waterloo (CA)

(72) Inventors: Michael Eoin Buckley, Grayslake, IL (US); Shirook M. Ali, Milton (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,004

(22) Filed: Sep. 13, 2013

(65) Prior Publication Data

US 2015/0078212 A1    Mar. 19, 2015

(51) Int. Cl.
H04B 7/00      (2006.01)
H04B 1/10      (2006.01)
H04L 5/14      (2006.01)
H04W 72/08     (2009.01)
H04W 72/12     (2009.01)

(52) U.S. Cl.
CPC .............. H04B 1/1027 (2013.01); H04L 5/14 (2013.01); H04W 72/082 (2013.01); H04W 72/085 (2013.01); H04W 72/1226 (2013.01); H04W 72/1231 (2013.01)

(58) Field of Classification Search
CPC ............................ H04W 72/08; H04B 1/1027
USPC .................................................. 370/252, 277
See application file for complete search history.

(56) References Cited

U.S. PATENT DOCUMENTS

| | | | |
|---|---|---|---|
| 6,674,808 B1* | 1/2004 | Griph | H03F 1/3247 333/149 |
| 2008/0101326 A1* | 5/2008 | Zhang et al. | 370/345 |
| 2008/0214224 A1* | 9/2008 | Ostman | H04W 52/54 455/522 |
| 2009/0060216 A1* | 3/2009 | Sweeney | G10K 11/178 381/71.2 |

(Continued)

FOREIGN PATENT DOCUMENTS

| | | | |
|---|---|---|---|
| WO | WO 20091063001 A2 * | 5/2009 | ............ H04W 72/08 |
| WO | 2012/130148 | 10/2012 | |
| WO | 2013/107214 | 7/2013 | |

OTHER PUBLICATIONS

Extended European Search Report issued in European Application No. 14184389.6 dated Feb. 5, 2015; 8 pages.

(Continued)

*Primary Examiner* — Brandon Renner
*Assistant Examiner* — Abdeltif Ajid
(74) *Attorney, Agent, or Firm* — Fish & Richardson P.C.

(57) ABSTRACT

Systems and apparatuses involve implementing methods that may include receiving, by enhanced user equipment (eUE), an assignment of Resource Blocks (RBs) from an eNodeB (eNB), wherein the eUE is configured to receive full-duplex transmissions; for each assigned RB, measuring interference caused by uplink transmissions from one or more legacy UEs; and reporting, to the eNB, the measured interference. The present implementations may provide an eUE-based approach, an eUE and eNB interactive approach, an eUE baseband approach, and an eUE analog approach to reducing interference for full duplex enabled mobile devices.

6 Claims, 4 Drawing Sheets

(56) References Cited

U.S. PATENT DOCUMENTS

| | | | |
|---|---|---|---|
| 2009/0135748 A1* | 5/2009 | Lindoff | H04W 72/048 370/296 |
| 2009/0286510 A1 | 11/2009 | Huber et al. | |
| 2009/0305715 A1 | 12/2009 | Barve | |
| 2009/0325625 A1 | 12/2009 | Hugl et al. | |
| 2010/0234071 A1* | 9/2010 | Shabtay | H04B 7/0408 455/562.1 |
| 2011/0170431 A1 | 7/2011 | Palanki et al. | |
| 2011/0195704 A1* | 8/2011 | Choi | H04W 72/1263 455/423 |
| 2012/0185605 A1* | 7/2012 | Patil | H04W 76/023 709/228 |
| 2012/0201173 A1* | 8/2012 | Jain | H04B 1/525 370/277 |
| 2012/0213146 A1 | 8/2012 | Liu et al. | |
| 2012/0219098 A1* | 8/2012 | Lindgren | H04L 25/03114 375/343 |
| 2013/0021954 A1 | 1/2013 | Montojo et al. | |
| 2013/0121186 A1 | 5/2013 | Vajapeyam et al. | |
| 2013/0194984 A1* | 8/2013 | Cheng | H04W 72/082 370/294 |
| 2014/0126532 A1* | 5/2014 | Bapat | H04W 76/045 370/331 |
| 2014/0328283 A1* | 11/2014 | Wan | H04L 5/14 370/329 |
| 2014/0362780 A1* | 12/2014 | Malladi | H04W 16/14 370/329 |
| 2015/0304090 A1* | 10/2015 | Ko | H04B 7/024 370/329 |
| 2016/0044689 A1* | 2/2016 | Wen | H04J 11/0023 370/330 |

OTHER PUBLICATIONS

Partial European Search Report issued in European Application No. 14181140.5 dated Feb. 18, 2015; 6 pages.

Office Action issued in U.S. Appl. No. 14/026,988 dated Apr. 22, 2015, 10 pages.

Office Action issued in Canadian Applicatien No. 2,863,008 dated Sep. 19, 2016.

Office Action issued in Canadian Application No. 2863038 dated May 31, 2017.

Communication Pursuant to Article 94(3) EPC issued in European Application No. 14181140.6 dated Aug. 11, 2017; 7 pages.

Communication Pursuant to Article 94(3) EPC issued in European Application No. 14181140.6 dated Sep. 19, 2017; 7 pages.

Office Action issued in U.S. Appl. No. 14/026,988 dated Sep. 21, 2017; 29 pages.

Advisory Action issued in U.S. Appl. No. 14/026,988 dated Dec. 19, 2017; 4 pages.

Office Action issued in Canadian Application No. 2863008 dated Apr. 11, 2018, 4 pages.

Communication Pursuant to Article 94(3) EPC issued in European Application No. 14181140.6 dated Jul. 19, 2018, 7 pages.

* cited by examiner

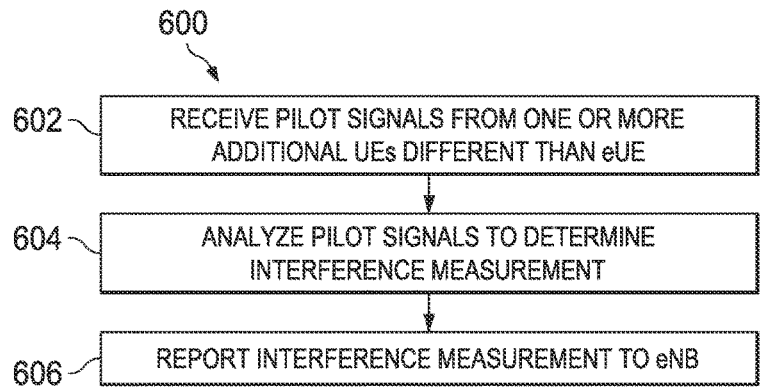
FIG. 6
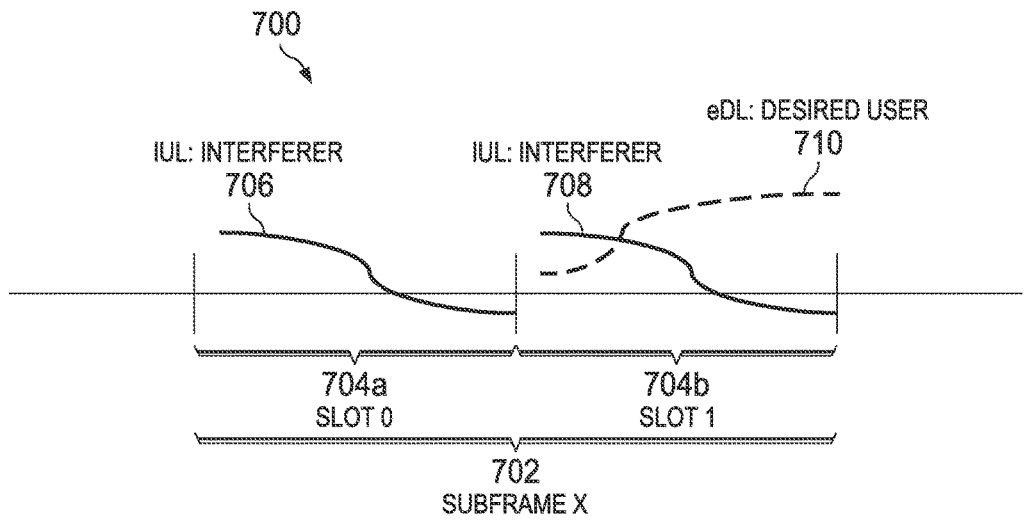
FIG. 7
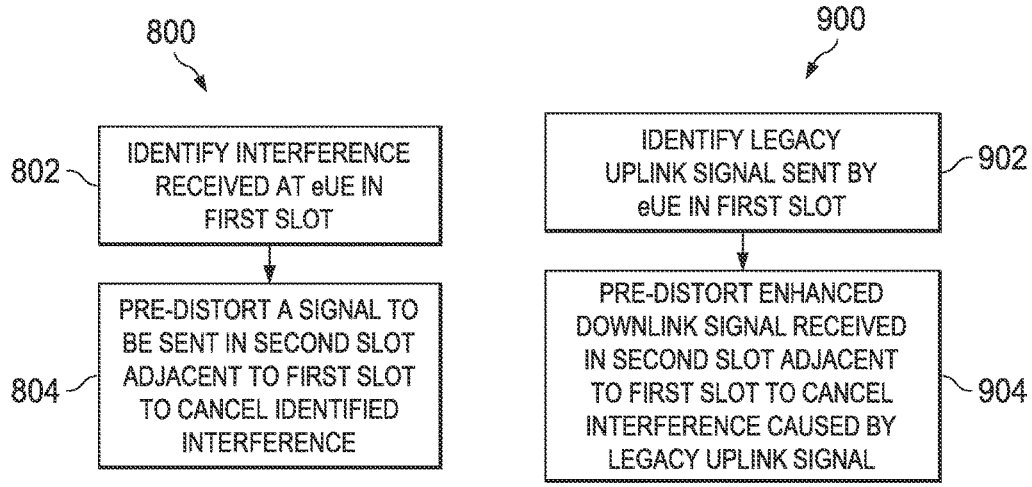
FIG. 8
FIG. 9

FULL DUPLEX RESOURCE REUSE ENABLEMENT

FIELD

The present disclosure pertains to mitigating interference in full duplex communication in wireless communications networks, such as Long-Term Evolution (LTE) networks.

BACKGROUND

Communication networks include wired and wireless networks. Example wired networks include the Public Switched Telephone Network (PSTN) and Ethernet local area networks. Example wireless networks include licensed cellular networks, as well as unlicensed wireless networks that connect to wired networks. Calls and other communications may be connected across wired and wireless networks.

Wireless communication networks include networks utilizing various networking technologies, such as LTE, Code Division Multiple Access (CDMA), Global System for Mobile communication (GSM), 802.11 WiFi, or other technologies. Techniques for performing full duplex communication in these networks may introduce interference between devices communicating with a base station at the same time or at the same frequency as another device.

DESCRIPTION OF DRAWINGS

FIG. 6 is a flow chart illustrating an example process for using pilot signals to measure interference by a neighboring UE.

FIG. 7 is a graphical diagram illustrating pre-distorting a signal to mitigate interference.

FIG. 8 is a flow chart illustrating an example process for pre-distorting a transmit signal to mitigate interference detected in a previous slot.

FIG. 9 is a flow chart illustrating an example process for pre-distorting a downlink signal to mitigate interference from an uplink channel.

Like reference symbols in the various drawings indicate like elements.

DETAILED DESCRIPTION

Figure 1:
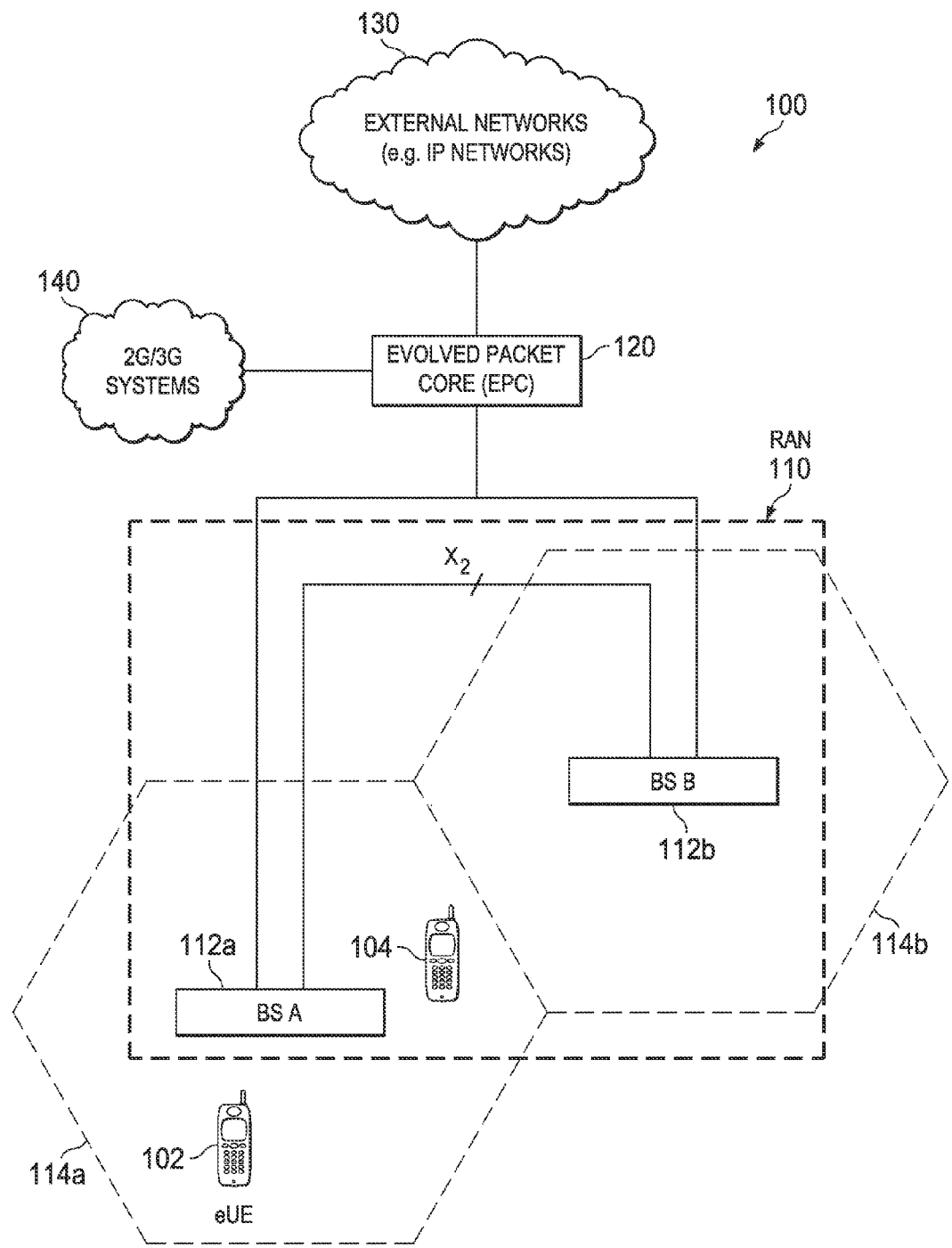
FIG. 1 is an example mobile communication system for mitigating interference in full duplex communication in wireless communications networks.

Aspects of the present disclosure pertain to systems, methods, and apparatuses that mitigate interference in full duplex communication in wireless communications networks such as Long-Term Evolution (LTE) networks. Various methods for improving user equipment (UE)-to-evolved Node B (eNB) communication link performance in an enhanced full duplex cellular communication system are described. In enhanced full-duplex communication systems, both uplink and downlink may use the same frequency. By using information from other interfering UEs within the same cell, co-channel interference may be estimated and reduced, which can improve channel quality measures (eg: Channel Quality Indicator (CQI), signal-to-noise ratio (SNR), Received Signal Strength Indication (RSSI) and Received Reference Signal Quality (RSRQ)) of a transmitted signal. Also the channel quality measurement computed by the eUE can be used by the eNB for additional scheduling purposes including assigning modulation coding, transmit power and transmission mode selection such as single layer MIMO, multi-layer MIMO and transmit diversity.

For the purposes of the present disclosure, "user equipment" (UE) refers to any device involved in mobile communication with an eNB that is communicating via standard half-duplex communication techniques. "Enhanced user equipment" (eUE) refers to any device communicating using enhanced full duplex communication techniques, i.e., using the same time and frequency resources for both uplink and downlink signals. A UE may communicate with the eNB over various legacy communication channels, such as, for example, a legacy uplink channel, or a legacy downlink channel. An eUE may communicate with the eNB over various enhanced communication channels, such as, for example, an enhanced uplink channel, or an enhanced downlink channel. In some cases, the enhanced uplink channel may be configured to be transmitted using the same time and frequency resources as a legacy downlink channel. Further, the enhanced downlink channel may be configured to be transmitted using the same time and frequency as a legacy uplink channel. Stated another way, full duplex communication may reuse the same time/frequency/space resource for both uplink and downlink transmissions.

The present disclosure describes various techniques to address interference as a result of UEs and eUEs using the same resources as described above. The techniques address various situations related to such communication, such as a situation where the full bandwidth of an interferer may be received while only a fraction of the bandwidth is used by the desired signal. Further, full duplex operation may mean that traditional measurements reported by the UE to the eNB are not applicable. Therefore, new measurement techniques for efficient operation are described herein. The present disclosure also provides various mechanisms for providing (e.g., to the eNB) ancillary information for performing interference mitigation. Interference cancellation techniques that may be performed at the radio frequency level, such as pre-distorting a transmitted or received signal, are also described.

In some implementations, the described techniques include adapting receiver bandwidth dynamically to cover frequencies used by a desired signal. The techniques also include using pilot signals (e.g., Rel'8 formatted signals) for identifying interferers, and reporting that information to the eNB in new measurements. Enhanced UE pilot sequences are also described that may be used for interference identification and mitigation. Repeating an interferer signal from an earlier slot for explicit interference cancellation is also described.

The techniques of the present disclosure may present several possible advantages. eUEs capable of full duplex operation may be utilized in the presence of legacy UEs in existing networks either without affecting operation of legacy UEs or mitigating the impact on legacy UEs by utilizing the techniques of the present disclosure for interference mitigation. Reducing disruption of existing services may lead to reduced cost for the network owner and may simplify transition to full duplex communication techniques.

Another advantage includes extending bandwidth for UL and DL, which may improve the rates and potentially the signal quality.

I. Exemplary Communication System

FIG. 1 is an example mobile communication system 100 for mitigating UE-to-eUE interference. The mobile communication system 100 shown in FIG. 1 may include one or more network nodes (e.g., 112a and 112b). It will be understood that the network node may take several forms in a mobile communication system, such as (but not limited to) an evolved Node B (eNB), a base station, a Node B, a wireless access point, a radio network controller, a base transceiver station, a layer two relay node, a layer three relay node, a femto cell, home evolved Node B (HeNB), a home Node B (HNB), a base station controller, or other network node that includes radio resource control. In the long term evolution (LTE) example of FIG. 1, the network nodes are shown as evolved Node Bs (eNBs) 112a and 112b. The example mobile communication system 100 of FIG. 1 may include one or more radio access networks 110, core networks (CNs) 120, and external networks 130. In certain implementations, the radio access networks 110 may be evolved-UMTS terrestrial radio access networks (E-UTRAN). In addition, in certain instances, core networks (CNs) 120 may be evolved packet cores (EPCs). Further, there may be one or more mobile electronic devices 102 and 104 operating within the mobile communication system 100. In some implementations, 2G/3G systems 140, e.g., Global System for Mobile communication (GSM), Interim Standard 95 (IS-95), IEEE Standards (e.g., WiFi), Universal Mobile Telecommunications System (UMTS) and CDMA2000 (Code Division Multiple Access) may also be integrated into the mobile communication system 100.

In the example LTE system shown in FIG. 1, the radio access network 110 includes eNB 112a and eNB 112b. Cell 114a is the service area of eNB 112a, and Cell 114b is the service area of eNB 112b. In this example, eUE 102 and UE 104 operate in Cell 114a and are served by eNB 112a. The eUE 102 and UE 104 may be any electronic device used by an end-user to communicate, for example, within the mobile communication system 100. The eUE 102 and UE 104 may transmit voice data, video data, user data, application data, multimedia data, text, web content or any other content.

This disclosure describes several ways that interference from legacy communication channels may be measured and managed in a full duplex wireless communication system. For the purposes of the present disclosure, full duplex communication is defined as uplink and downlink transmissions between an eUE, such as eUE 102, and an eNB, such as eNB 112a, occurring or being capable of occurring at the same time and on the same frequency resources.

In one example implementation, the eUE 102 may detect interference from the neighboring UE 104 and report the interference to the associated eNB 112a. The eUE 102 may first receive resource block assignments from the eNB 112a. The eUE 102 may then scan the assigned resource block for interference by dynamically moving an eUE transceiver to each resource block to produce an interference measurement. The eUE 102 may then report the interference measurement to the eNB 112a.

In some implementations, the eUE 102 may receive pilot signals from one or more additional UEs, such as the UE 104. The eUE 102 may analyze the pilot signals to determine an interference measurement. The eUE 102 may then report the interference measurement to the eNB 112a.

In some cases, the eUE 102 may identify interference received in a first slot. The eUE 102 may then pre-distort a signal to be sent in a second slot adjacent to the first slot to cancel the identified interference.

In another example, the eUE 102 may identify a legacy uplink signal sent by the eUE 102 in a first slot. The eUE 102 may then pre-distort an enhanced downlink signal received in a second slot adjacent to the first slot to cancel interference caused by the identified legacy uplink signal.

In general, the eUE 102 or UE 104 may be referred to as mobile electronic device, user device, mobile station, subscriber station, portable electronic device, mobile communications device, wireless modem, or wireless terminal. Examples of a UE or eUE (e.g., eUE 102 or UE 104) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of an eUE or UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The eUE 102 or UE 104 may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the eUE 102 or UE 104 may include the device without such a module. The terms "UE" or "eUE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile communication system which implements a radio access technology, such as UMTS, CDMA2000 and 3GPP LTE. For example, the radio access network (RAN) 110 included in an LTE telecommunications system is called an EUTRAN. The EUTRAN can be located between the UEs and core network 120 (e.g., an evolved packet core, EPC). The EUTRAN includes at least one eNB. The eNB can be a radio base station that may control all or at least some radio related functions in a fixed part of the system. The at least one eNB can provide a radio interface within their coverage area or a cell for the UEs to communicate. The eNBs may be distributed throughout the cellular network to provide a wide area of coverage. The eNBs directly communicate with one or more UEs, eUEs, other eNBs, and the core network.

The eNBs 112a and 112b may be the end point of the radio protocols towards the eUE 102, and UE 104 and may relay signals between the radio connection and the connectivity towards the core network 120. In certain implementations, the EPC may be the main component of a core network 120. The core network 120 may include a backbone network, which may be a central part of the mobile communication system 100. The core network 120 may include other components, such as (but not limited to) a mobility management entity (MME), a serving gateway (SGW), or a packet data network gateway (PGW). The MME may be the main control element in the core network 120 responsible for the functionalities comprising the control plane functions related to subscriber and session management. The SGW can serve as a local mobility anchor, such that the packets are routed through this point for intra radio access network 110 (e.g., intra-EUTRAN) mobility and mobility with other legacy 2G/3G systems 140. The SGW functions may include the user plane tunnel management and switching. The PGW may provide connectivity to the services domain comprising external networks 130, such as the IP networks. The eUE 102, UE 104, radio access network 110 (e.g., EUTRAN), and core network 120 (e.g., EPC) are sometimes referred to together as the evolved packet system (EPS).

In some implementations, the eNBs 112a and 112b may receive a power measurement of a legacy uplink channel that is measured at the eUE 102 (such as, for example, the legacy uplink channel of the UE 104). The eNB 112a may then schedule uplink and downlink transmissions to avoid interference received at the eUE 102.

The eNBs 112a and 112b may also assign the eUE 102 a specific pilot sequence different from pilot sequences assigned to one or more interfering legacy UEs, such as UE 104. The specific pilot sequence may then be used in an enhanced downlink channel to the eUE 102.

Though described in terms of FIG. 1, the present disclosure is not limited to such an LTE environment.

II. Exemplary Interference Mitigation Techniques

Figure 2:
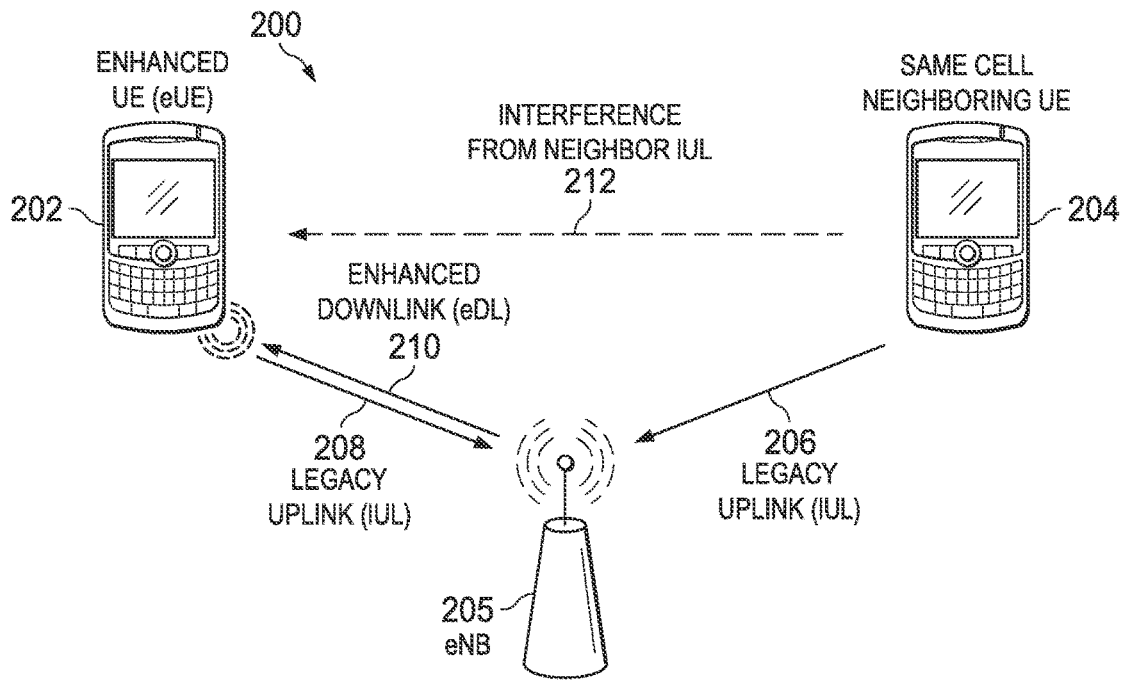
FIG. 2 is an example network for detecting and managing user equipment (UE) interference.

FIG. 2 is a schematic illustrating an example network 200 for detecting and managing interference by a UE 204 at an eUE 202. As shown, the eUE 202 and the eUE 204 are associated with an eNB 205. Though, the eUE 204 may be in a different cell without departing from the scope of the disclosure. The eUE 202 is communicatively coupled to the eNB 205 by a legacy uplink channel 208 and an enhanced downlink channel 210. UE 204 is communicatively coupled to the eNB 205 using a legacy uplink channel 206. Legacy uplink channel 206 interferes with the enhanced downlink channel 210 of the eUE 202, which is detected by the eUE as interference 212. Note that the enhanced downlink does not cause interference to neighboring UEs reception in the same cell and, as a result, is compatible with legacy UEs using legacy uplink channels.

In some implementations, the eUE 202 may detect the interference 212 and report interference measurements to the eNB 205. The eNB 205 may, in turn, perform scheduling of the uplink and downlink communications of the eUE 202 and UE 204 to mitigate the interference 212. For example, eUE 202 may be scheduled on a predefined resource by the eNB 205. The eUE 202 may experience the highest interference if full bandwidth is used for the legacy uplink channel 206 by the UE 204. The eNB 205 can assigns sub-carriers or resource blocks to the eUE 202 that will not be affected or will be affected less by interference caused by the UE 204.

a. Scheduling Technique

Figure 3:
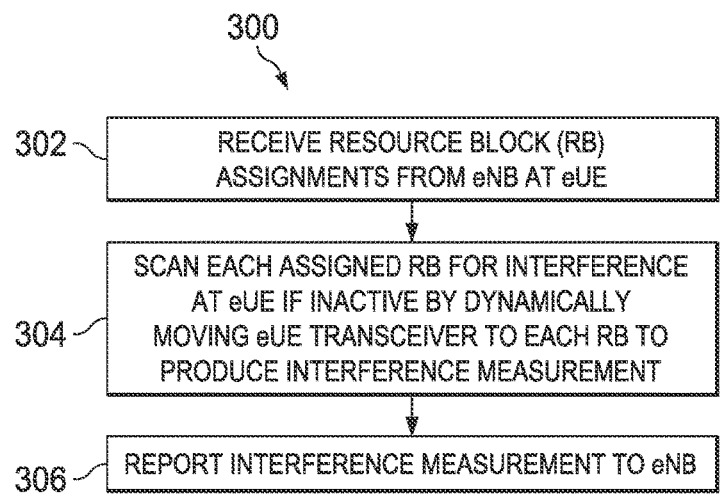
FIG. 3 is a flow chart illustrating an example process for interference mitigation.

FIG. 3 is a flow chart 300 illustrating an example process for interference mitigation at an eUE. At step 302, an eUE receives resource block assignments from an eNB. At step 304, the eUE scans each assigned resource block for interference by dynamically moving an eUE transceiver through each resource block to produce interference measurements. For example, the eUE may measure interference by scanning each subcarrier in each of the assigned resource blocks to determine interference from uplink transmissions from the one or more legacy UEs. In some cases, the interference measurements may include a request to communicate using a subset of the assigned resource blocks or specified sub-carriers in the assigned resource blocks. The interference measurement may also include a power measurement, a pilot signal, a sounding sequence, or other measurements or signals.

At step 306, the eUE reports the measurement to the eNB. In some implementations, the eUE may transmit an indication to the eNB that a subset of the assigned resource blocks or specified sub-carriers in the assigned resource blocks are selected for communication. The eUE may then communicate with the eNB using the subset or the specified sub-carriers. In some instances, the eUE may report carrier frequencies and interference power for uplink transmissions receive a different assignment of resource blocks in response from the eNB.

Figure 4:
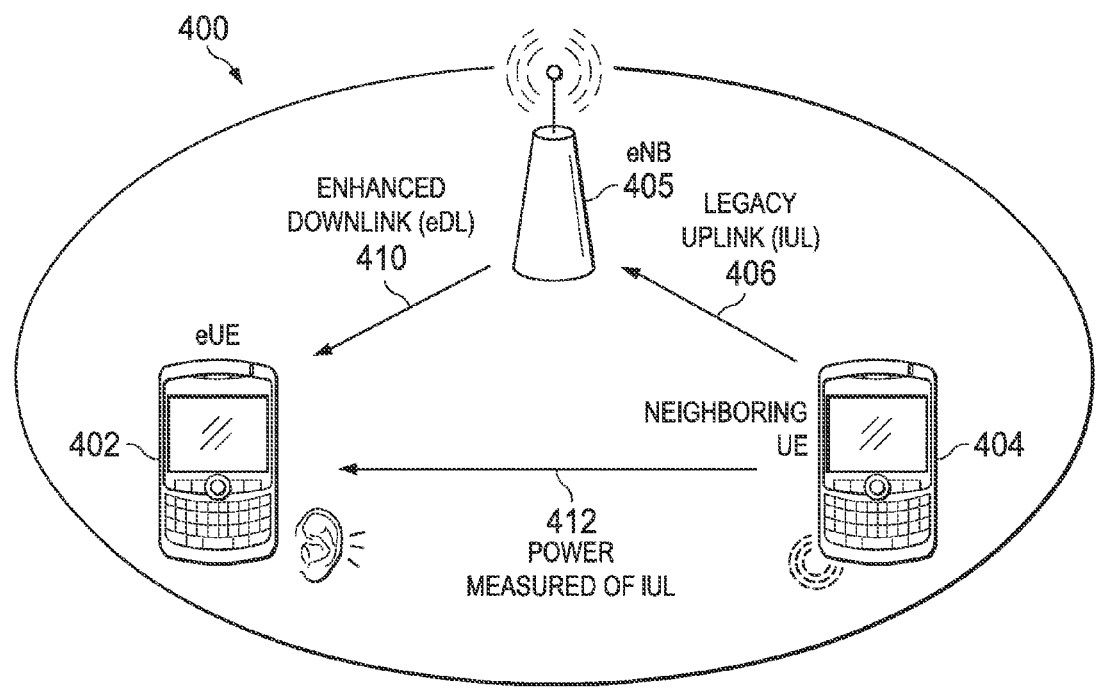
FIG. 4 is an example network for performing power measurements of UEs.

FIG. 4 is an example network 400 for performing a power measurement of a UE at an eUE. The network 400 includes an eUE 402 and a neighboring UE 404. An eNB 405 is communicatively coupled to both the eUE 402 and the UE 404. The eUE 402 receives the enhanced downlink channel 410. The UE 404 transmits the legacy uplink channel 406.

As shown, the eUE 402 determines a power measurement 412 of the legacy uplink channel 406. In some implementations, the power measurement 412 can be performed at regular intervals by the eUE 402 and reported to the eNB 405. The power measurement 412 may also be a long-term measurement of the power of the legacy uplink channel 406 over a period of time. In some cases, the eUE 402 may determine the power measurement 412 in response to a command from the eNB 405 instructing the eUE 402 to perform the power measurement 412. Such measurements may be made across the full bandwidth of different sub-carriers. The measurements may also be specific to a resource block or group of resource blocks. The interference signal strength included in the measurement may be computed over an agreed subset of resource blocks. In summary, the power measurement 412 may indicate noise including interference on the enhanced downlink channel 410 caused by the legacy uplink channel 406. The eUE 402 may report the power measurement 412 to the eNB 405, allowing the eNB 405 to mitigate the interference in the enhanced downlink channel 410. For example, the eNB may use the measurements to schedule enhanced downlink resources or legacy resources to mitigate interference. The eNB may also use the measurements in scheduling an enhanced downlink transmission mode.

Figure 5:
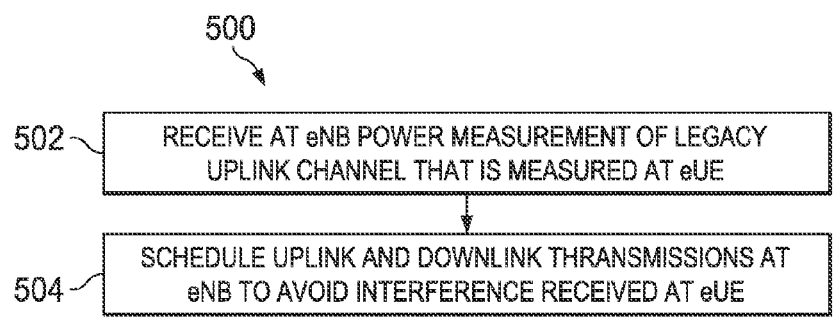
FIG. 5 is a flow chart illustrating an example process for avoiding UE interference by uplink and downlink scheduling.

FIG. 5 is a flow chart 500 illustrating an example process for using power measurements of neighboring UEs to avoid interference by uplink and downlink scheduling. At step 502, the eNB receives a power measurement of the legacy uplink channel that is measured at an eUE. In some cases, the power measure may include at least one of a sub-carrier, interference measurements of the legacy uplink channel over a plurality of subframes, an identifier of an interfering legacy UE, or other information. In some instances, the eNB may transmit to a legacy UE using the legacy uplink channel a request to transmit a sounding signal in a specified resource. In these instances, the eUE may then perform the power measurement on the sounding signal the legacy UE transmitted. The eNB may also transmit, to the eUE, a request to measure interference from the sounding signal transmitted by the legacy UE in the specified resource.

At step 504, the eNB schedules uplink and downlink transmissions to avoid the interference received at the eUE. In some implementations, the eNB schedules downlink transmissions to the eUE in subframes different from subframes assigned to an interfering legacy UE for uplink transmissions in the legacy uplink channel. The eNB may also determine a modulation coding scheme (MCS) for an enhanced downlink channel based on the power measurement of the legacy uplink channel and transmit to the eUE a request use the determined MCS for downlink transmissions. In some cases, the downlink transmissions may be scheduled by the eNB in accordance with an allocation request from the eUE. In some implementations, the eNB can indicate resource blocks to the UE which can contain an acceptably low amount of (or no) UL transmissions (eNB knows this as it is the scheduler). The UE may then adapt its front end according to this signaled information. These resource blocks may be different than resource blocks containing information destined for the UE.

b. Pilot Signal Technique

In some implementations, an eUE may enhance interference cancellation at baseband through the use of pilot signals. For example, an eNB may assign different pilot signals to each associated UE or eUE, and may then request that each UE or eUE send the assigned pilot signal at a certain time. An eUE may detect these pilot signals, and may determine which of the other UEs are causing interference based on the received pilot signals. In some cases, the eUE may report the received pilot signal and an interference measurement to the eNB, which may determine the identity of the interfering UE. Once the eNB determines the UE that is causing interference, the eNB may, in some cases, take measures to prevent the interference between the UE and the eUE, such as, for example, rescheduling uplink and downlink transmissions to different slots. In some implementations, the pilot signals may be sounding symbols, such as, for example, Rel'8 sounding symbols.

FIG. 6 is a flow chart 600 illustrating an example process for using pilot signals to measure interference by a neighboring UE. At step 602, an eUE receives pilot signals from one or more additional UEs. At step 604, the eUE analyzes the pilot signals to determine interference measurements. In some implementations, each interference measurement may be associated with the UE from which the pilot signal is received. In some implementations, the eNB may assign different pilot signals to different UEs to enable the eUE or the eNB to determine which of the other UEs on the network is causing interference. For example, if a certain UE is assigned a first pilot signal and an eUE receives that pilot signal, the eUE can correlate the pilot signal to a UE that caused UE interference. In some cases, the eUE may blindly decode uplink transmissions to determine pilot sequences assigned to the one or more interfering legacy UEs.

At step 606, the eUE reports the interference measurement to eNB. In some cases, the eUE reports, to the eNB, interference power for uplink transmissions from the one or more interfering legacy UEs.

c. Pre-Distortion Techniques

FIG. 7 is a graphical diagram 700 showing a signal being pre-distorted to mitigate interference detected in a previous slot. The diagram shows a subframe 702 including two slots 704a and 704b. A legacy uplink channel interferer signal 706 is detected at slot 704a. A copy 708 of the signal 706 is combined with an enhanced downlink signal 710 in slot 704b to pre-distort the enhanced downlink signal 710. In doing this pre-distortion, the interference caused by the legacy uplink channel interferer signal 706 may be substantially canceled.

FIG. 8 is a flow chart 800 illustrating an example process for pre-distorting a transmit signal to mitigate interference detected in a previous slot. At step 802, an eUE identifies interference received in a first slot. At step 804, the eUE pre-distorts a signal to be sent in a second slot adjacent to the first slot to cancel the identified interference. The signal may comprise at least one of an uplink signal, a downlink signal, or other types of signals. In some cases, if the signal is a downlink signal, the interference may be caused by both the uplink transmissions of the legacy UEs and a transmitter of the eUE. In some implementations, pre-distorting the signal includes adding an inverse of the identified interference to the signal in order to cancel the interference.

FIG. 9 is a flow chart 900 illustrating an example process for pre-distorting a received enhanced downlink signal to mitigate interference caused by a legacy uplink channel. At step 902, a legacy uplink signal sent by an eUE is identified in a first slot. At step 904, an enhanced downlink signal received in a second slot adjacent to the first slot is pre-distorted to cancel interference caused by the legacy uplink signal.

III. Additional Exemplary Implementations

As noted above, the present implementations relate to "Full Duplex" communications—i.e., communications in which the uplink and downlink take place at the same time and at the same band. Full duplex may reuse the same time/frequency/space resource for both uplink downlink transmissions. The present implementations may enable the use of both Enhanced UEs (eUEs) capable of full duplex operation as well as existing/legacy UEs with existing networks without affecting operation of the legacy UEs.

The present implementations may include (1) means for adapting the receiver bandwidth dynamically to exactly cover frequencies used by the desired signal; 2) means for using Rel 8 or other sounding signals and information contained in new measurements; 3) means for reuse of Rel 8 or other sounding signals as a means of aiding an interference cancellation mechanism, as well as an enhanced UE pilot sequence; and 4) means for repeating the interferer signal from an earlier slot for the purposes of reproducing this pattern for explicit interference cancellation.

In some aspects, legacy uplink of neighboring UEs may cause interference to new enhanced UE downlink transmissions, i.e., legacy UEs may cause interference for full duplex enabled UEs. The present implementations provide a number of solutions to alleviate the effects of the interference.

In some implementations, an eUE enabled solution may be provided. The eUE may include a modified front-end to reject frequency resources that contain interference. The eUE may analyze received transmissions and choose to use resources (from among the resources assigned by the eNB) that have the lowest interference levels.

For example, a method of reducing interference from a legacy User Equipment (UE) in a full-duplex enabled Enhanced User Equipment (eUE) may be provided. The method may include (1) receiving sub-carrier/Resource Block (RB) assignments from the eNB at the eUE; (2) scanning each sub-carrier/RB assigned for interference at the eUE; and/or (3) dynamically adapting the transceiver at the eUE to only use the carrier frequency/RB that has the least amount of interference from among the sub-carriers/RB's assigned by the eNB. The eUE enabled solution may include additional, less, or alternate functionality, including functionality discussed elsewhere herein.

In another implementation, an eUE and eNB interactive solution may be provided. The eUE may make certain power measurements associated with the UL (uplink) channel and/or perform measurements of UL sounding signals transmitted by other UEs to measure potential interference. Then, the eUE may send or transmit recommendations to the eNB on resource assignment, such as via a sub-carrier frequency and/or Resource Block.

For example, a method of reducing interference from a legacy User Equipment (UE) in a full-duplex enabled Enhanced User Equipment (eUE) may be provided. The method may include receiving at an eNB a power measurement of a legacy uplink channel that is measured at the eUE; and scheduling UL/DL transmissions at the eNB to avoid interference received at the eUE. The eUE and eNB interactive solution may include additional, less, or alternate functionality, including functionality discussed elsewhere herein.

In another implementation, an eUE baseband approach may be provided. The eUE may enhance interference cancellation at the baseband through the use of pilot symbols. For example, the method may include using pilot signals in the eDL (enhanced downlink) signal to reduce interference at the eUE. The eUE baseband approach may include additional, less, or alternate functionality, including functionality discussed elsewhere herein.

In another implementation, an eUE analog approach may be provided. The eUE analog approach may include post-distorting interference received at the eUE in an active slot (slot1) by subtracting interference received in an idle slot (slot0). In other words, the method may include canceling interference received at the eUE in an active slot by subtracting the interference received in an adjacent/preceding idle slot from the signal received in active slot. The eUE analog approach may include additional, less, or alternate functionality, including functionality discussed elsewhere herein.

In some implementations, a method for managing interference includes receiving, by enhanced user equipment (eUE), an assignment of Resource Blocks (RBs) from an eNodeB (eNB), and the eUE is configured to receive full-duplex transmissions. For each assigned RB, interference caused by uplink transmissions from one or more legacy UEs is measured. The measured interference is reported to the eNB.

In some implementations, a method of reducing interference includes receiving, from an eUE, a power measurement of a legacy uplink channel measured at the eUE, and the eUE is configured to receive full-duplex transmissions. Downlink transmissions to the eUE are scheduled, at the eNB, to avoid interference from the legacy uplink channel.

In some implementations, a method for mitigating interference includes assigning, by an eNB, an eUE a specific pilot sequence different from pilot sequences assigned to one or more interfering legacy UEs, and the eUE is configured to receive full-duplex transmissions. The specific pilot sequence is used in an enhanced downlink (eDL) to the eUE, and the eDL includes full-duplex transmissions.

In some implementations, a method of mitigating interference includes determining, by the eUE, interference from uplink transmissions of legacy UEs during a first slot when the eUE is inactive, and the eUE is configured to receive full-duplex transmissions. A signal in a second slot is pre-distorted to reduce the determined interference in the signal.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a signal software product or packaged into multiple software products.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps not implied by the order they appear in the claims.

What is claimed is:

1. A method of mitigating interference, the method comprising:
   receiving, by an enhanced User Equipment (eUE), uplink transmissions including pilot sequences from one or more interfering legacy UEs, wherein the pilot sequences for the one or more interfering legacy UEs are different from a specific sequence assigned to the eUE, wherein the eUE operates in an enhanced full-duplex mode with an eNode B (eNB), the enhanced full-duplex mode with the eNB includes the eUE using a same time and frequency resource for a first uplink signal and a first downlink signal with the eNB, and the one or more interfering legacy UEs use the same time and frequency resource for the uplink transmissions;
   blindly decoding the uplink transmissions to determine the pilot sequences assigned to the one or more interfering legacy UEs;
   determining, by the eUE, interference to the first downlink signal between the eNB and the eUE using the pilot sequences for the one or more interfering legacy UEs;
   identifying, by the eUE, an identity of at least one interfering legacy UEs of the one or more interfering legacy UEs based on the pilot sequence of the at least one interfering legacy UE in the received uplink transmissions; and
   reporting the interference with the first downlink signal and an identifier of the identified at least one interfering legacy UE to the eNB.

2. The method of claim 1, further comprising receiving, from the eNB, information identifying a same pilot sequence is assigned to the one or more interfering legacy UEs or different pilot sequences assigned to the one or more interfering legacy UEs.

3. The method of claim 1, further comprising reporting, to the eNB, interference power for uplink transmissions from the one or more interfering legacy UEs.

4. A device for mitigating interference, comprising:
one or more processors configured to:
receive, by an enhanced User Equipment (eUE), uplink transmissions including pilot sequences from one or more interfering legacy UEs, wherein the pilot sequences for the one or more interfering legacy UEs are different from a specific sequence assigned to the eUE, wherein the eUE operates in an enhanced full-duplex mode with an eNode B (eNB), the enhanced full-duplex mode with the eNB includes the eUE using a same time and frequency resource for a first uplink signal and a first downlink signal with the eNB, and the one or more interfering legacy UEs use the same time and frequency resource for the uplink transmissions;
blindly decode the uplink transmissions to determine the pilot sequences assigned to the one or more interfering legacy UEs;
determine, by the eUE, interference to the first downlink signal between the eNB and the eUE using the pilot sequences for the one or more interfering legacy UEs;
identify, by the eUE, an identity of at least one interfering legacy UE of the one or more interfering legacy UEs based on the pilot sequence of the at least one interfering legacy UE in the received uplink transmissions; and
report the interference with the first downlink signal and an identifier of the identified at least one interfering legacy UE to the eNB.

5. The device of claim 4, the one or more processors configured to receive, from the eNB, information identifying a same pilot sequence is assigned to the one or more interfering legacy UEs or different pilot sequences assigned to the one or more interfering legacy UEs.

6. The device of claim 4, the one or more processors configured to report, to the eNB, interference power for uplink transmissions from the one or more interfering legacy UEs.

* * * * *